United States Patent [19]
Stauffer

[11] 3,810,191
[45] May 7, 1974

[54] MULTI-STYLUS THROUGH FIELD RECORDING HEAD

[75] Inventor: Norman L. Stauffer, Englewood, Colo.

[73] Assignee: Honeywell Inc., Minneapolis, Minn.

[22] Filed: Oct. 26, 1972

[21] Appl. No.: 300,961

[52] U.S. Cl. ...................... 346/74 MC, 340/174.1 F
[51] Int. Cl. ......................... G11b 5/22, G01d 15/12
[58] Field of Search ......... 346/74 MC; 179/100.2 C; 340/174.1 F

[56] References Cited

UNITED STATES PATENTS

| | | | |
|---|---|---|---|
| 3,414,893 | 10/1968 | Coccagna | 346/74 MC |
| 3,164,628 | 1/1965 | Anderson | 340/174.1 F |
| 3,432,838 | 3/1969 | Winkler | 346/74 MC |
| 3,492,670 | 1/1970 | Ault et al. | 346/74 MC |
| 3,683,382 | 8/1972 | Ballinger | 346/74 ES |

*Primary Examiner*—Bernard Konic
*Assistant Examiner*—Jay P. Lucas
*Attorney, Agent, or Firm*—Arthur H. Swanson; Lockwood Burton; Mitchell J. Halista

[57] ABSTRACT

A magnetic recording head for recording on a magnetically responsive recording medium is arranged to incorporate a core structure of high magnetic retentivity material with individual core members being magnetized by a respective winding to produce a magnetic flux through the magnetically responsive recording medium. A flux return path is arranged to distribute the magnetic flux in the return path to a flux density level which is ineffective to produce a recording on a recording medium and is arranged to provide a flux return path on the other side of the recording medium from the magnetic recording head. A common bias and reset winding is arranged on the core structure and is separately energized to normally bias the core structure to a magnetic state which is ineffective to produce a recording on the recording medium during the absence of a signal on the individual windings on the core members and to reset the core structure to a non-recording state after the core members have been placed in a recording state by a signal applied to the respective windings on the core members.

5 Claims, 3 Drawing Figures

MULTI-STYLUS THROUGH FIELD RECORDING HEAD

The present invention relates to magnetic recording. More specifically, the present invention is directed to a magnetic recording head having a plurality of recording styli.

An object of the present invention is to provide an improved magnetic recording head for a recording on a magnetically responsive recording medium.

Another object of the present invention is to provide an improved multi-stylus recording head for selectively producing a magnetic flux at predetermined and spatially separate locations corresponding to a selected recording stylus.

A further object of the present invention is to provide an improved magnetic recording head using high magnetic retentivity core material.

SUMMARY OF THE INVENTION

In accomplishing these and other objects, there has been provided, in accordance with the present invention, a magnetic recording head having a core structure of a high magnetic retentivity material with individual energizable recording stylii formed from a common core body. Each of the recording stylii is energized by a separate winding thereon to produce a magnetic recording field. The magnetic recording head is arranged to record on a magnetically responsive recording medium and is provided with a magnetic flux return path on the other side of the magnetic recording medium from the recording head to produce a high magnetic flux density at the recording stylii sites while the common core flux return path provides a low magnetic flux density in the magnetic return path to restrict the recording process to the recording sites defined by the recording stylii. A common bias and reset winding is provided on the core structure and is separately energized to normally bias the core structure and the recording stylii into a non-recording state and to reset the recording stylii into a non-recording state after the recording stylii have been energized by an input signal applied to the separate windings thereon.

BRIEF DESCRIPTION OF THE DRAWINGS

A better understanding of the present invention may be had when the following detailed description is read in connection with the accompanying drawings in which.

DETAILED DESCRIPTION

Figure 1:
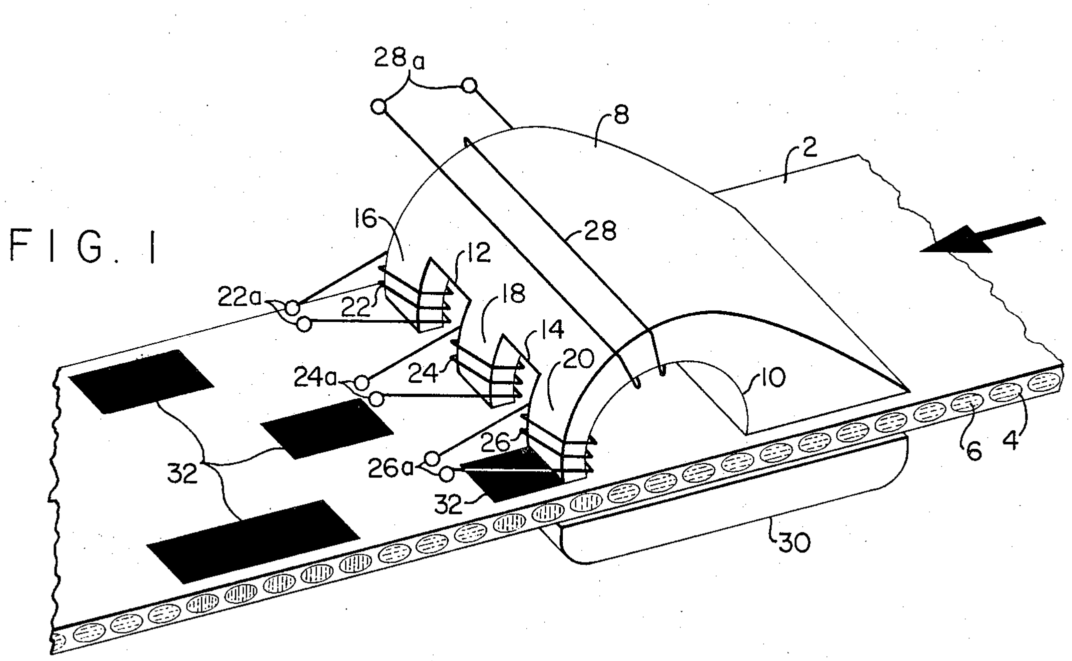
FIG. 1 is a pictorial representation of a multi-stylus recording head embodying the present invention.

Referring to FIG. 1 in more detail, there is shown a magnetically responsive recording medium composed of a web member having a plurality of capsules 4 uniformly distributed therein. The capsules 4 are each arranged to contain a suspension of magnetically responsive particles which may be selectively oriented by a magnetic field to produce a visible recording on the surface of the recording medium 2, e.g., the particles 6 may be uniformally pre-oriented in a plane parallel to the plane of the web member 2 and re-oriented by a recording magnetic field perpendicular to the plane of the web member 2. A suitable recording medium for use as the recording medium 2 shown in FIG. 1 is shown and claimed in U.S. Pat. No. 3,683,382 of Dale O. Ballinger, which issued on Aug. 8, 1972 and is assigned to the same assignee as the present application.

A magnetic head structure for recording on the recording medium 2 is shown as a core member 8 having a substantially semi-circular cross section and is preferably composed of a material having a high magnetic retentivity characteristic, e.g., ferrite. The half cylinder of magnetic material forming the core 8 is provided with a longitudinal semi-circular groove 10 which is eccentrically located toward one side of the half cylinder 8. Thus, the groove 10 is effective to define a narrow core portion of the half cylinder 8 between the groove 10 and one side of the core member 8 and a wide core portion between the groove 10 and the other side of the core member 8. The narrow portion of the core member 8 defined by the groove 10 is divided into a fingered or comb configuration by slots extending across the narrow portion of the core member 8 and intersecting the groove 10 to form recording stylii. As illustrated in FIG. 1, the slots are shown as representative slots 12 and 14 which divide the narrow part of the core member 8 into three serrations or writing stylii 16, 18 and 20 is provided with an energizing coil or winding wrapped thereon. Specifically, a first energizing coil 22 is provided on the first writing pin 16, a second energizing coil 24 is provided on the second writing pin 18 and a third energizing coil is provided on the third writing pin 20. Each of the winding 22, 24 and 26 is terminated in a pair of energizing signal input terminals, i.e., winding 22 is associated with a pair of input terminals 22*a*, winding 24 is associated with input terminals 24*a* and winding 26 is associated with input terminals 26*a*. A bias and reset winding 28 is wrapped around the core member 8 along the groove 10 and is provided with a pair of winding terminals 28*a* suitable for connection to a source of bias current and flux reset signals (not shown). A magnetic field return path is provided on the other side of the recording medium 2 from the core member 8 by a backing plate 30 extending between the writing stylii 16, 18 and 20 and the foresaid wide part of the core 8 defined by the offset groove 10.

MODE OF OPERATION

In the aforesaid arrangement wherein the recording medium 2 has the magnetically responsive particles 6 as flake-like particles preoriented with their faces parallel to the plane of the web member 2, a uniformally reflective surface is obtained on the surface of the web member in the areas wherein the magnetic particles 6 have this uniform preorientation position. When the particles 6 are reoriented by the magnetic field of the writing stylii 16, 18 and 20, they are positioned with their faces perpendicular to the plane of the web member 2 and, thus, form a light absorbtive area in the web member 2 which appears to an observer as a dark trace on the aforesaid reflective surface of the web member 2. Such traces or recorded areas are shown in FIG. 1 as contrasting areas 32. The backing plate 30 is preferably made from a material having a low magnetic retentivity and low magnetic reluctance, e.g., soft iron.

Figure 2:
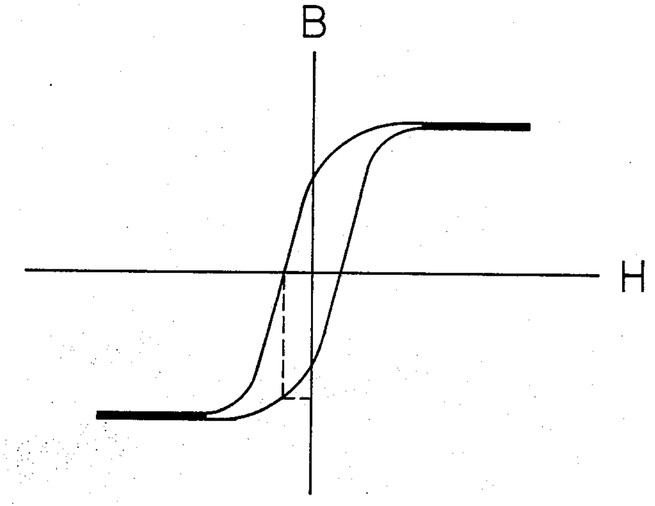
FIG. 2 is a pictorial representation of a B–H curve for the magnetic structure shown in FIG. 1.
Figure 3:
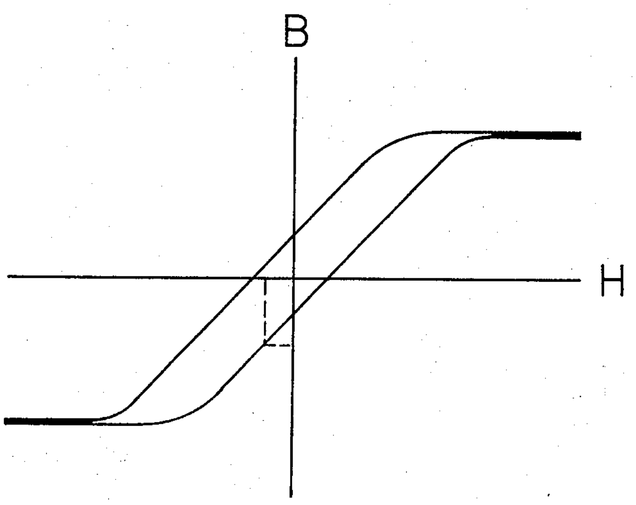
FIG. 3 is a pictorial representation of a B–H curve for a modified magnetic head structure from that shown in FIG. 1.

In FIG. 2, there is shown a B–H curve for the magnetic head configuration shown in FIG. 1. It should be noted from this curve that a large output from the type of material used for the core 8 is obtained with a predetermined energizing current applied to a selected energizing winding. This magnetic field output may be compared with a B–H curve shown in FIG. 3 which represents the operation of the magnetic head structure shown in FIG. 1 without the magnetic field return path provided by the backing plate 30. Thus, the backing plate 30 serves to provide an efficient, i.e., low reluctance, flux return path through the magnetic paper between the selected writing pin and the core structure 8. This more efficient magnetic circuit causes the B–H curve to shift as shown in FIG. 2 to provide a greater magnetic field output for a core material having a given magnetic coercivity. Further, the core material has a relatively high retentivity suitable for producing the traces 32 on the recording medium 2.

The bias and reset winding 28 is provided to supply a normal bias current to determine an "at rest" position for the core structure along the hysteresis curve which will produce a substantially zero output magnetic flux from the writing stylii 16, 18 and 20. When the disturbing field produced by an energized winding is created by an energizing signal applied to a selected writing stylus the core structure is transferred from the "at rest" position along the hysteresis curve to a point that will produce a magnetic flux output sufficient to reorient the flakes in the magnetic recording medium 2. In order to restore a writing stylus to its zero flux position along the hysteresis curve, a reset, or deenergizing, signal is applied to the bias and reset winding 28 after the removal of the energizing signal from the previously selected writing stylus. This deenergizing signal is superimposed on the bias signal and is effective to restore the zero flux level of the writing stylii to terminate the recording operation. In order to prevent the recording head from recording on the recording medium 2 at other portions of the flux return path other than those directly beneath a selected writing stylus, the area of the core member 8 providing the flux return path in common with the backing plate 30 is arranged as a large surface area adjacent to the recording member 2 to reduce the magnetic flux density passing through the recording member 2. This large area is provided by the offset grooved 10 which is effective to leave a relatively large area of the core 8 to serve as a flux return path in comparison to the narrow area of the writing stylii 16, 18 and 20 which serve to concentrate the magnetic flux to produce a record trace on the magnetic recording medium 2.

Further, the slots 12 and 14 are cut into the core 8 for a distance sufficient to increase the magnetic reluctance through adjacent recording stylii to prevent stray magnetic flux from creating a writing flux density at unselected ones of the recording stylii.

Accordingly, it may be seen that there has been provided, in accordance with the present invention, a magnetic recording head having a plurality of recording stylii at spatially separated locations and a magnetic path structure having a low magnetic reluctance.

The embodiments of the invention in which an exclusive property or privilege is claimed are defined as follows:

1. A magnetic recording head comprising a first magnetic core member having a first end face of a predetermined surface area and a second end face spaced from said first end face and being in a common plane therewith while having a predetermined surface area substantially greater than said surface area of said first end face, whereby a magnetic flux concentration insufficient to cause recording is associated with said second end face said first magnetic core member being made of a high magnetic retentivity characteristic material, an energizing winding wound on said magnetic core member and arranged to be connected to a source of an energizing signal suitable for producing a magnetic flux from said first and second end faces, a bias and reset winding wound on said magnetic core and arranged to be connected to a source of a bias and reset signal suitable for normally biasing said first core member into a non-magnetic flux producing state and to reset said core member into said state after the application and termination of an energizing signal to said energizing winding, and a second core member forming a magnetic flux return path and being located adjacent to said first and second end faces and separated therefrom by a distance sufficient to allow a recording medium to pass therebetween.

2. A magnetic recording head as set forth in claim 1 wherein said material is ferrite.

3. A magnetic recording head as set forth in claim 1 wherein said first end face is divided into a plurality of separate core projections forming recording stylii and said energizing winding means includes a separate winding on each of said projections and said bias and reset winding is arranged to be common to all of said projections.

4. A magnetic recording head as set forth in claim 1 wherein said second core member is made from a low magnetic retentivity and low magnetic reluctance characteristic material.

5. A magnetic recording head as set forth in claim 4 wherein said material is soft iron.

* * * * *